S. M. LANGSTON.
CUTTING AND CONVEYING MECHANISM.
APPLICATION FILED NOV. 20, 1908.
922,918.
Patented May 25, 1909.
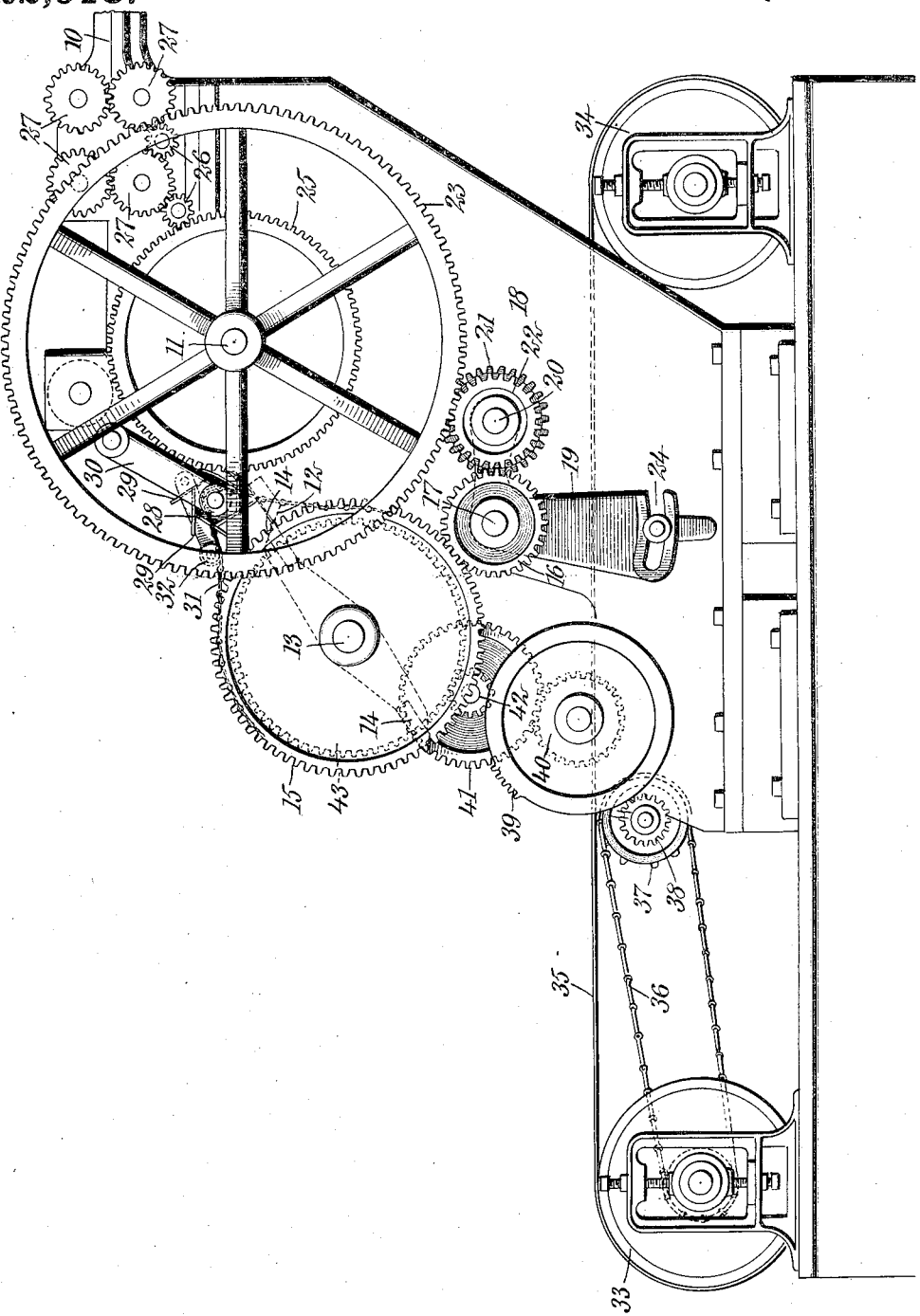
WITNESSES
Geo. W. Naylor
C. W. Fairbank
INVENTOR
Samuel M. Langston
BY Munn & Co.
ATTORNEYS

UNITED STATES PATENT OFFICE.

SAMUEL M. LANGSTON, OF CAMDEN, NEW JERSEY.

CUTTING AND CONVEYING MECHANISM.

No. 922,918.　　　　Specification of Letters Patent.　　　　Patented May 25, 1909.

Application filed November 20, 1908.　Serial No. 463,574.

*To all whom it may concern:*

Be it known that I, SAMUEL M. LANGSTON, a citizen of the United States, and a resident of Camden, in the county of Camden and State of New Jersey, have invented a new and Improved Cutting and Conveying Mechanism, of which the following is a full, clear, and exact description.

This invention relates to certain improvements in machinery for cutting or subdividing paper, cardboard, pasteboard, cellular board, or the like, and relates more particularly to a combined cutting and conveying mechanism, whereby the separate sections or pieces may be delivered from the machine intermittently in piles rather than delivering each piece as soon as it is separated or cut off. The conveying mechanism and the cutting mechanism are operated from the same source of power, and the conveying mechanism is operated intermittently and at predetermined intervals in respect to the cutting mechanism, so that when the desired number of pieces have been cut off, the conveying mechanism will operate to deliver them from the machine. The conveying mechanism involves a belt or endless carrier from which the piles of material may be taken by the operator, and the normal speed of the machine is such that while the operator is removing one pile and disposing of them, a second pile will be accumulated and delivered.

Reference is to be had to the accompanying drawing, forming a part of this specification, in which the figure shows one form of my machine in side elevation.

In the specific form illustrated, I provide a feed table 10, across which the long rolls or strips of material to be subdivided are delivered, and at the delivery end of the table are suitable pairs of feed rollers of any suitable character. The material passes over a large drum mounted on the shaft 11 and thence to a stationary cutter blade 12. Adjacent the drum is a rotary cutter mounted on a shaft 13 and having two parallel cutter blades 14, adapted to alternately pass adjacent the stationary cutter blade to subdivide the material. The shaft 13 is operated continuously and at constant speed from any suitable source of power and in any suitable manner. The shaft at one end carries a gear wheel 15 which intermeshes with a gear wheel 16 mounted upon a stub shaft 17 on the end frame 18 of the machine. Also mounted upon this stub shaft is an L-shaped member 19, supporting at its outer end a stub shaft 20, upon which are rotatably mounted two gear wheels 21 and 22. The gear wheels may freely rotate on their stub shaft 20 but are held against rotation in respect to each other.

The shaft 11 of the main feed drum carries a large gear wheel 23, and this gear wheel is in the same plane and adapted to intermesh with the pinion 22. Power is transmitted from the gear wheel 15 to the gear wheel 16 and thence by the pinions 21 and 22, to the gear wheel 23, to operate the latter continuously. The pinion 22 is removable from the pinion 21 and may be replaced by a larger or smaller pinion, which may be brought into proper mesh with the gear wheel 23 by swinging the arm 19 about the shaft 17 as a center. The lower end of the arm is provided with a slot 24, through which extends a suitable set screw or locking bolt for holding the arm against accidental movement. The shaft 11, in addition to the gear 23, also carries a second gear 25, by means of which motion may be transmitted through suitable pinions 26 and gear wheels 27 to smaller pairs of feed rollers, not shown.

For holding the material in engagement with the stationary cutter blade 12 and for preventing the material from bulging or bending between the drum and the blade, I provide a rotary beater 28, preferably polygonal in cross section and having a plurality of flexible flaps or wings 29 adapted to engage with and rub across the upper surface of the material adjacent the stationary cutter blade. This beater is preferably mounted in depending pivotally-mounted arms 30 and may be driven by a chain 31, extending over a sprocket wheel on the shaft 13. The chain may be kept taut by a suitable tightening roller 32.

It will thus be noted that the cutter operates continuously and at constant speed, and that the feeding mechanism operates continuously but at any desired speed in respect to that of the cutter. By replacing the pinion 22 by a larger one, the feeding mechanism will operate faster and the pieces cut off will be of greater length. By employing a very small pinion, the feeding mechanism may be operated at a slow speed and the pieces cut off will be correspondingly shorter. To cut pieces of greater length than is convenient by changing the pinion 22, I may remove one of the two cutter blades 14. To avoid the delay in changing the pinions 22, the gears 23 and 15 and the gears carried by the arm 19 and by the stub shaft 17, may be duplicated upon the opposite side of the machine, so that while the machine is being driven through the gears of one side, the pinions at the opposite side may be thrown out of mesh and replaced by different sized ones. Of course, only one arm could be employed at a time, unless the same sized pinions were used.

As soon as the material is cut off at the stationary blade 12, it falls directly downward onto my improved conveying mechanism. This includes two drums or pulleys 33 and 34, adjacent the end of the machine, and over these drums passes an endless belt or carrier 35. The upper surface of the belt comes beneath the cutter, so that as fast as the pieces are cut off, they fall directly onto the belt and may be removed from beneath the cutter by means of said belt. For driving the belt, the drum or pulley 33 is provided with a sprocket wheel for engagement with a chain 36, and the latter is driven from a sprocket wheel 37 mounted on the machine. Upon the same shaft with the sprocket wheel 37, is a pinion 38 engaging with a mutilated gear wheel 39 carried by the machine. The mutilated gear is operated continuously through a chain of gears 40, 41 and 42, the last of which intermeshes with a gear wheel 43 secured to the shaft 13 and shown in dotted lines. As the shaft 13 and the cutter rotate at constant speed, it is evident that the mutilated gear 39 will also rotate at constant speed, but this gear is provided with teeth along only a comparatively short portion of its periphery so that the pinion 38, the chain 36, and the conveyer 35, remain substantially stationary during one portion of the revolution of the gear 39 and are rotated during the remaining portion. The relative sizes of the gears 40, 41, 42 and 43 determine the frequency of the operation of the conveyer, while the relative sizes of the pinion 38 and gear 39 and the length of the arc through which the teeth are present on the gear 39, determine the extent to which the conveyer is moved each time it is operated. This may be varied at will within the discretion of the operator. It is found convenient to so arrange the gears that a pile of one dozen or two will collect during the time the conveyer remains stationary. The machine is run at such speed that while the operator is removing one pile and disposing of it, a second pile will have accumulated and been removed from beneath the cutter.

Having thus described my invention, I claim as new and desire to secure by Letters Patent:

1. In a machine of the class described, the combination of a cutter for subdividing sheet material into sections and operating at constant speed, feeding mechanism for said sheet material and operating at uniform speed variable in respect to the speed of the cutter, and a conveyer mechanism receiving the sections from said cutter and operating intermittently to deliver them from the machine in groups.

2. In a machine of the class described, the combination of a rotary cutter for subdividing material into sections, an endless belt below said cutter and constituting a conveyer for the sections separated by said cutter, and means for operating said endless belt intermittently to deliver the sections in groups or piles which contain a predetermined number of sections.

3. In a machine of the class described, the combination of a cutter for subdividing sheet material into sections, feeding mechanism therefor, means for varying the relative speeds of said cutter and said feeding mechanism, to vary the length of the sections, and a conveyer receiving the sections from said cutter and operating to intermittently deliver the sections from the machine in groups or piles.

In testimony whereof I have signed my name to this specification in the presence of two subscribing witnesses.

SAMUEL M. LANGSTON.

Witnesses:
CLAIR W. FAIRBANK,
PHILIP D. ROLLHAUS.